United States Patent [19]

Arney

[11] Patent Number: 4,474,245

[45] Date of Patent: Oct. 2, 1984

[54] COLLAPSIBLE FIRE FIGHTING BUCKET

[76] Inventor: Donald B. Arney, P.O. Box 86430, North Vancouver, British Columbia, Canada, V7L 4K6

[21] Appl. No.: 374,790

[22] Filed: May 4, 1982

[51] Int. Cl.³ .............................................. A62C 28/00
[52] U.S. Cl. ........................................ 169/53; 169/34
[58] Field of Search ......................... 169/34, 35, 53; 239/171; 244/136; 229/55, DIG. 3; 242/107.2; 254/372; 294/69

[56] References Cited

U.S. PATENT DOCUMENTS

| 1,023,816 | 4/1912 | Coggeshall | 242/107.2 |
| 1,152,846 | 9/1915 | Ross | 150/48 |
| 1,508,724 | 9/1924 | Rose | 150/48 |
| 2,051,940 | 8/1936 | Chichester-Miles | 150/48 |
| 3,572,441 | 3/1971 | Nodegi | 169/53 |
| 3,661,211 | 5/1972 | Powers | 169/53 |
| 3,710,868 | 1/1973 | Chadwick | 169/53 |

Primary Examiner—Jeffrey V. Nase
Assistant Examiner—Jon M. Rastello
Attorney, Agent, or Firm—Carver & Co.

[57] ABSTRACT

Collapsible fire fighting bucket is suspended from helicopter and filled from a lake. The bucket has a tubular extension with a discharge port extending from its bottom for dumping water onto the fire. The extension can be released from and withdrawn into the bucket by remote control, and a lip seal around the discharge port closes automatically to minimize leakage from the full bucket. Stiffeners in the side wall of the bucket adapt the bucket to the desired capacity without the use of conventional spill ports.

16 Claims, 7 Drawing Figures

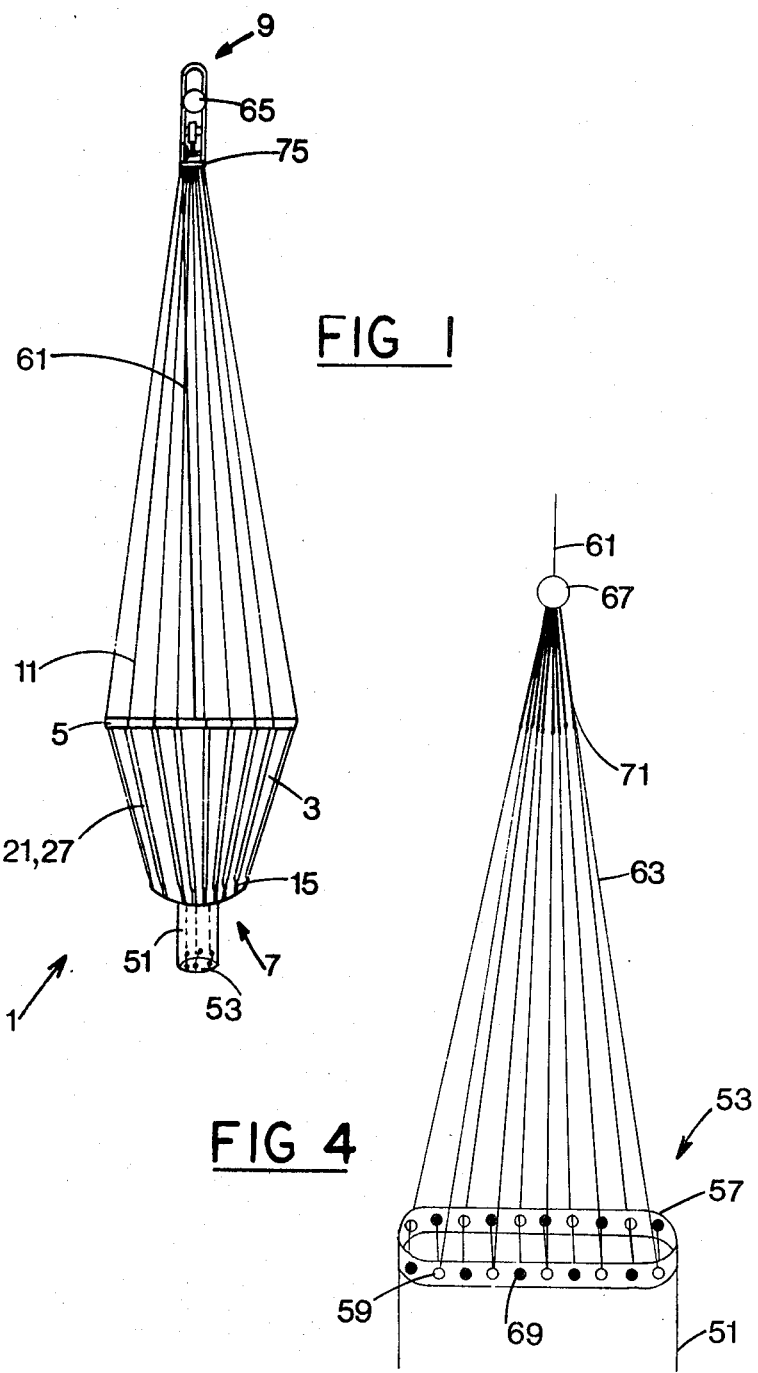

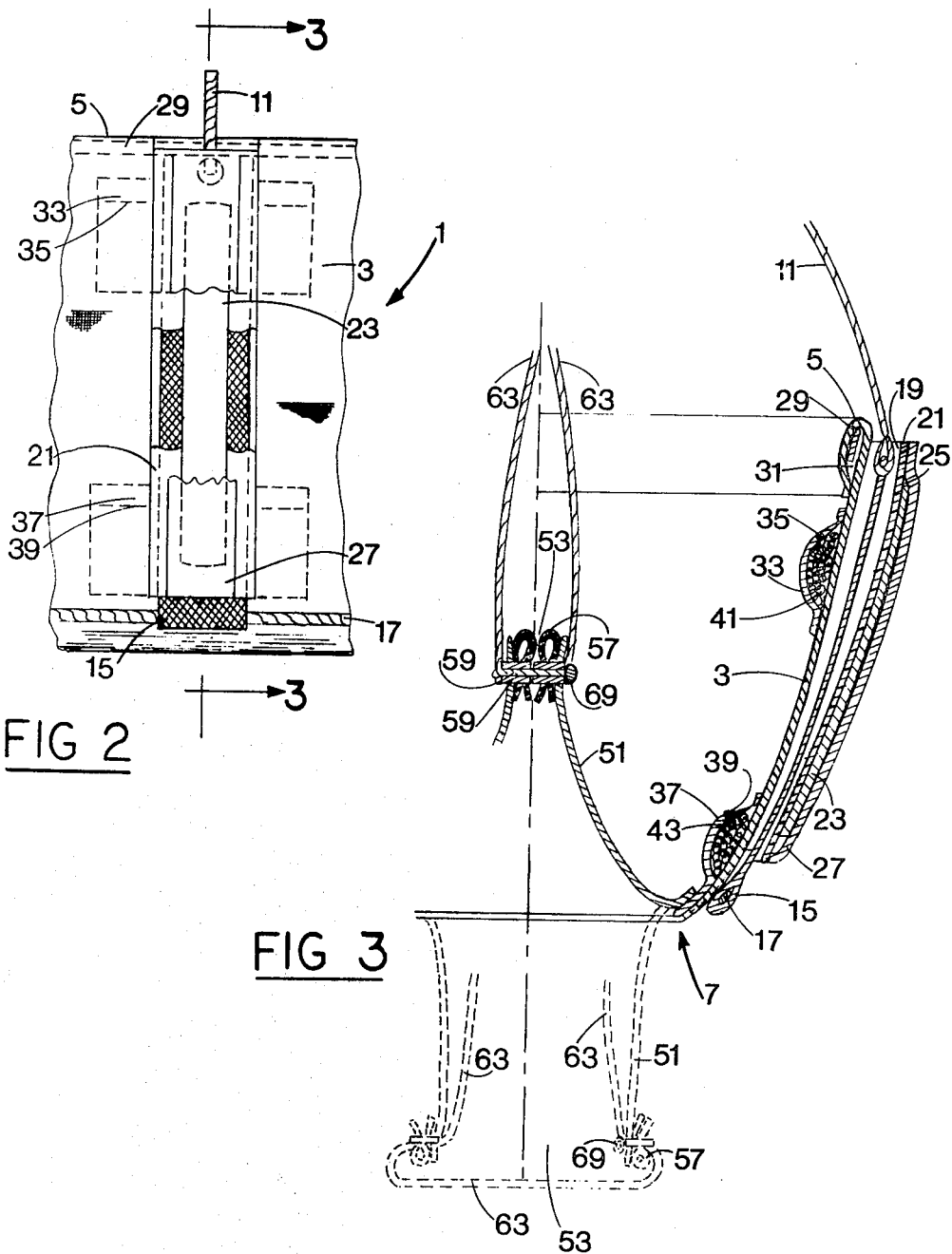

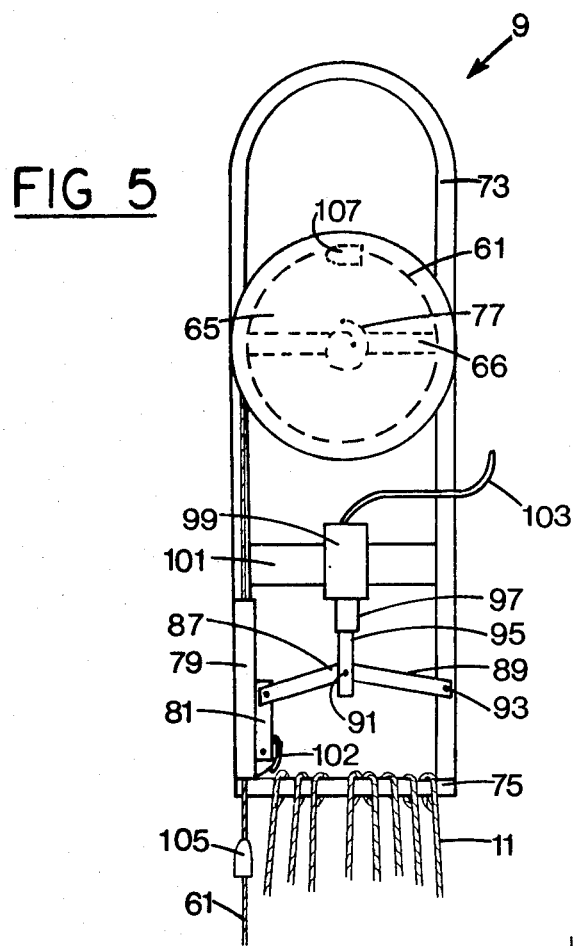
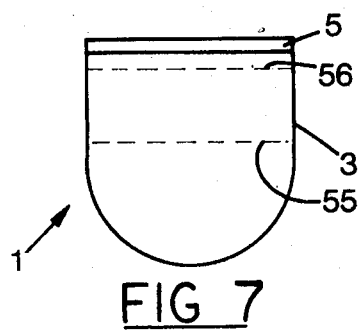
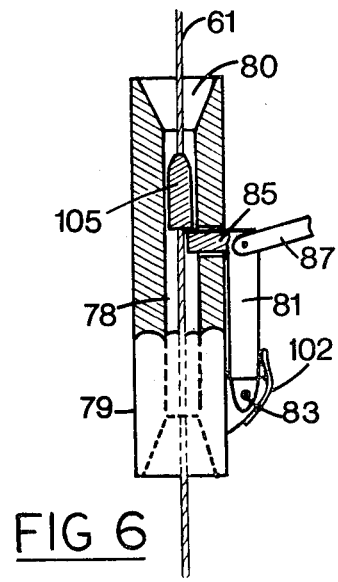

COLLAPSIBLE FIRE FIGHTING BUCKET

BACKGROUND OF THE INVENTION

1. Field of the Invention

The invention relates to a collapsible fire fighting bucket adapted to be suspended from an aircraft, especially from a helicopter, and to be filled from an open body of water, eg. from a lake or river.

2. Prior Art

A collapsible fire fighting bucket adapted to be suspended from a helicopter and to be filled by immersion into a lake is known from U.S. Pat. No. 3,661,211 to Powers. This bucket is formed of a collapsible external frame which supports the flexible side walls. The frame includes a rigid upper peripheral frame member connected to a rigid circular bottom member by means of four rigid, normally upright, but collapsible braces. The water is released from the bucket by opening two doors in the bottom by means of a ram operated by pressurized fluid. Slots, closable by zippers, are provided at a certain height in the flexible side wall for limiting the capacity of the bucket and thereby adapting it to the lifting capabilities of the aircraft. This known bucket is rather bulky in its collapsed state, and the rigid, flat bottom with its water release mechanism makes it fairly heavy and expensive to manufacture.

U.S. Pat. No. 3,572,441 to Nodegi describes a liquid discharge tank for fire fighting in the shape of a flexible bag, closed at the top and having a snout-like extension at its bottom. The extension can be pulled into the bag by means of a rope attached to its lower end. The rope is guided through the central opening of a cylinder, which closes the upper end of the bag and has a hanging bar adapted to be connected to the underside of a helicopter. A combined solenoid and hydraulically operated locking mechanism locks a stopper on the rope inside the cylinder to keep the extension in its withdrawn position when the bag is full. When the mechanism is released, the extension is forced out of the bag under the pressure of the liquid, thereby releasing the liquid onto the fire. When the bag is empty, the rope and with it the extension is pulled up again.

The discharge port of the extension must be positioned above the liquid level inside the bag in order to prevent leakage. Because of this, the extension has a considerable length and can get twisted when the rope is released, so that the liquid cannot be dumped from the bag. Twisting can also make it impossible to withdraw the extension into the bag. This bag must be filled through the extension and cannot be filled by dumping it into a lake, which limits its application because a filling station is required. Valuable time can be lost by this way of operation, and the fighting of forest fires, especially in remote areas, is not practical with this device.

SUMMARY OF THE INVENTION

It is an object of the invention to provide a collapsible fire fighting bucket that is simple, lightweight and rugged in construction, that can easily be folded and assembled, and requires minimal space on the aircraft, when it is flown to the location of the fire.

A further object is to provide a bucket that can be filled by dumping it into a lake and pulling it up again, and that has a reliable and uncomplicated water release mechanism, so that the operation is fast and easy.

It is a further object of the invention to provide a bucket that can adjust its capacity to the load carrying capabilities of the aircraft without the use of spill ports in its side wall.

According to the invention, a collapsible fire fighting bucket to be suspended from an aircraft and preferably to be filled from an open body of water, eg. from a lake, comprises an open bucket body made of pliable material, and having an upper rim, a side wall and a bottom. A tubular extension made of pliable material extends from the bottom and has a free end formed with a discharge port. The tubular extension is adapted to be withdrawn into the bucket towards its open top with the discharge port remaining below the water surface of the full bucket. The bucket further comprises upper rim stiffening means. Means for suspending the bucket from the aircraft comprise a connector adapted to be connected to the aircraft and a plurality of first flexible tension links connected between the bucket and the connector. Supporting means are provided for releasably supporting the free end of the tubular extension comprising a second flexible tension link adapted to be held under tension for holding the tubular extension in its withdrawn position and to be released for allowing the tubular extension to extend for dumping the water. A resilient lip on the discharge port forms two opposite lip sections, and sealing means for bringing the opposite lip sections into sealing engagement for minimizing water leakage from the tubular extension cooperate with the second flexible tension link.

A further embodiment of the invention comprises an open bucket having an upper rim, a side wall made of pliable material, a bottom, upper rim stiffening means and a dump valve in the bottom. A plurality of peripherally spaced apart ribs are connected to the side wall and extend longitudinally between the upper rim and the bottom. The ribs are dimensioned such that the side wall remains essentially straight while submerged under a low pulling force, but will bulge outwards while submerged under a higher pulling force so as to adapt the capacity of the bucket to the load carrying capability of the aircraft. Means for suspending the bucket from an aircraft are provided, and means for operating the dump valve.

A detailed disclosure following, related to drawings, describes a preferred embodiment of the invention which however is capable of expression in structure other than that particularly described and illustrated.

DESCRIPTION OF THE DRAWINGS

FIG. 1 is a simplified diagrammatic side elevation of a bucket according to the invention;

FIG. 2 is a simplified fragmented side elevation of part of the side wall of the bucket;

FIG. 3 is a cross section of the bucket along the line 3—3 of FIG. 2;

FIG. 4 is a simplified diagrammatic perspective view showing the discharge port of the tubular extension of the bucket and the supporting means;

FIG. 5 is a simplified diagrammatic side elevation of the connector for suspending the bucket from an aircraft;

FIG. 6 is a side elevation, partly in fragmented longitudinal cross section, of the guide tube and locking mechanism of the connector; and FIG. 7 is a diagrammatic simplified side elevation of the bucket showing its shape when filled.

DETAILED DISCLOSURE

FIGS. 1 through 4

The bucket body 1 is made of a pliable material, e.g. a vinyl impregnated woven synthetic fabric. It has a side wall 3, an upper rim 5 and a bottom 7. The bucket body 1 is suspended by a plurality of first flexible tension links in the form of ropes or wires 11 and belts 15. Each rope is connected with the upper end to a crossbar 75 of a connector 9, and with the lower end to the upper end of a belt 15, the lower end of which is anchored on a circumferential rope 17, which supports the bottom 7 of the bucket.

The belts 15 are received in open ended belt pockets 19, which are arranged around the side wall 3 of the bucket. The belt pockets 19 are formed by the side wall 3 and first longitudinal fabric cover strips 21 connected to the side wall by stitching or welding. Stiffener battens 23, e.g. made of fiberglass, are received in closed stiffener pockets 25 formed by the first cover strips 21 and second longitudinal fabric cover strips 27, stitched to the first cover strips 21 and narrower than these. The battens 23 provide a plurality of peripherally spaced apart ribs connected to the side wall and extending longitudinally between the upper rim and the bottom.

Upper rim stiffener battens 29 are received in upper rim pockets 31. Although one long batten in one upper rim pocket could be used to give the upper rim circular rigidity, it is preferred however to use three overlapping upper rim stiffener battens 29 in three overlapping upper rim pockets 31 for this purpose, because three shorter battens can be stowed away in the helicopter more easily.

An upper ballast pocket 33 closable by a zipper 35 and a lower ballast pocket 37 closable by a zipper 39 are positioned on one side only on the inside of the side wall 3 of the bucket. These pockets can be filled with ballast, e.g. chains 41 and 43.

A tubular extension 51 made of water impervious fabric is connected to the side wall 3 at the bottom 7 of the bucket. This tubular extension is shown in FIG. 1 and FIG. 3 (in broken lines) in its extended position for dumping the water from the bucket through the open discharge port 53, and in FIG. 3 (in full lines) in its withdrawn position with the discharge port closed for holding the water. In FIGS. 1 and 3, the bucket is shown empty and consequently the side wall is essentially straight. Partly or completely filled, the side wall bulges outwards as shown in FIG. 7 and for reasons to be explained below.

Around the discharge port 53 a sealing lip 57 is provided for sealing the discharge port in its withdrawn position, where it is below the water level in the bucket. This sealing lip is made of a resilient material, e.g. a synthetic rubber named Neoprene. The sealing lip 57 is fastened to the fabric of the tubular extension 51 by means of a plurality of grommets 59. The tubular extension is supported in its withdrawn position by a second flexible tension link in the form of a rope 61 and a plurality of third flexible tension links in the form of ropes 63. The rope 61 is wound on a reel 65 of the connector 9 as will be described in more detail below. One end of the rope 61 is anchored on a ring 67. A plurality of intermediate strings 71, made of a resilient material like rubber, are connected with one end to the ring 67 and with the other end to the ropes 63. The lower ends of the ropes 63 are slidably penetrating the grommets 59 on one sealing lip section and are terminated by plastic balls 69 behind grommets on the opposite sealing lip section. The terminations by balls 69 alternate along the sealing lip with the penetrating ends of the ropes 63 as shown in FIG. 4.

FIGS. 5 and 6

The connector 9 for suspending the bucket from the helicopter comprises a hanging bar 73 having a crossbar 75 to which the ropes or wires 11 are attached. A reel 65 is rotatably connected to a crossbar 66 and biased by a recoil spring 77 cooperating with the reel 65 for winding up the rope 61 for withdrawing the tubular extension 51 into the bucket. The rope passes through the inner bore 78 of a guide tube 79 connected to the hanging bar 73. A latch 81 is pivotally linked to the guide tube at the pivot point 83. A tongue 85 of the latch 81 extends through an opening into the guide tube 79. A first horizontal lever 87 is pivotally linked with one end to the latch 81 and pivotally linked with its other end to a second horizontal lever 89 by a pin 91. The other end of the second horizontal lever 89 is pivotally connected to the hanging bar 73 at a pivot point 93. A vertical drawbar 95 is connected with one end to the pin 91 and with its other end to the plunger 97 of a solenoid 99, which is connected to a crossbar 101 of the hanging bar 73. A leaf spring 102 holds the latch 81 in its rest position as shown in FIG. 6. A cable 103 connects the solenoid 99 to an electric operating system (not shown) on the helicopter. Two bullet-shaped stoppers 105 and 107 are fastened concentrically on the rope 61 with their rounded head portions pointing at each other. To facilitate the entry of the stoppers into the guide tube 79, the inner bore 78 tapers outwardly to wider entrance openings 80 on both sides of the guide tube. The distance on the rope between the stoppers corresponds approximately to the distance between the discharge port 53 in its withdrawn or extended position respectively.

FIG. 7 shows the approximate shape of the bucket when filled partly to a lower water level 55 or when filled to capacity to a high water level 56 in the manner explained below.

OPERATION

The bucket can be transported in the helicopter in its collapsed state like a folded umbrella. For assembling the bucket, the upper rim stiffener battens 29 are pushed into the upper rim pockets 31 to give the upper rim a semi-rigid circular shape. The tubular extension 51 is withdrawn into the bucket body 1 under the force of the recoil spring 77, which rotates the reel 65 until the rope 61 is wound up and keeps the tubular extension under tension. The stopper 105 is located slightly above the latch 81, and the stopper 107 is wound up on the reel 65. The bucket is now suspended from the helicopter and is ready for filling. In FIG. 5, the rope is shown in operation during the winding up procedure where the stopper 105 has not yet passed the guide tube 79.

The helicopter flies with the empty bucket to a lake, and the empty bucket will angle back during forward flight. The one-sided ballast formed by the chains 41 and 43 prevents the bucket from spinning on the suspending lines 11. The helicopter then hovers over the lake, dumping the bucket into the water and the ballast allows the bucket to submerge quickly for filling.

When the helicopter pulls the filled bucket out of the water, the weight of the water on the tubular extension 51 keeps the ropes 63 and 61 under tension and the stopper 105 is locked in position by the latch 81 as shown in FIG. 6. The tension in the ropes 63, averaged by the resiliency of the strings 71, brings the sealing lip 57 into sealing abutment, which is necessary to prevent water leakage from the discharge port 53, which is now positioned below the water level in the bucket. It is important to form the tubular extension short and wide as otherwise there is the danger that the tubular extension gets twisted up and stuck either while extending it when dumping the water or while withdrawing it, when the bucket is empty. Also the water must be dumped as quickly as possible to prevent premature evaporation over the fire. For this reason, the tubular extension is preferably formed so short, that the discharge port 53 remains in the water in the full bucket. This feature necessitates a good seal of the discharge port.

Apart from generally supporting the side wall 3 the stiffener battens 23 have the further function of limiting the capacity of the bucket to a pre-determined amount. The load carrying capability of a helicopter depends greatly on the environmental conditions like altitude and temperature, which determine the air density. Generally, the load carrying capability decreases with increasing altitude and temperature, i.e with decreasing air density. The stiffener battens 23 are dimensioned such that they remain essentially straight under water, thus keeping the side wall essentially straight, when the bucket is slowly pulled out of the water as by a helicopter in weak condition. When the bucket has been pulled out of the lake, the stiffener battens bulge outwards, under the water pressure, so that the bucket assumes a shape as shown approximately in FIG. 7. Due to the slow pull, the bucket has a frusto-conical shape under water and therefore a limited capacity. The bucket will thus be only partly filled to a lower water level 55, after having been pulled out of the water.

When, however, the bucket is pulled out of the water with greater speed by a helicopter in strong condition, the side wall of the bucket will bulge outwards already under the lake surface, allowing maximum filling capacity. The bucket will then be filled to a high water level 56, after having been pulled out of the water.

Thus by controlling the speed of pulling the bucket out of the water, the filling capacity can be easily controlled which avoids the extra expense, handling and complications of spill ports in the side wall of the bucket.

The full bucket is now flown to the location of the fire. For dumping the water, the pilot activates the solenoid 99 for a short time. Thereby the plunger 97 lifts the levers 87 and 89 upwards, pulling the latch 81 away from the guide tube 79 against the force of the leaf spring 102, so that the tongue 85 releases the stopper 105. This brings the tubular extension 51 into its extended position under the pressure of the water, as shown in broken lines in FIG. 3. The rope 61 unwinds from the reel 65, rotating the reel and winding up the recoil spring 77. The second stopper 107 passes through the guide tube 79 pushing momentarily away the tongue 85 with its rounded head portion, while the solenoid is already deactivated. When the tubular extension 51 is fully extended and the water is rushing through the discharge port, the stopper 107 is located below the tongue 85 of the latch 81 and as soon as the torquing force of the recoil spring 77 exerted on the reel 65 is greater than the downwards pushing force of the rest of the water, the increasing upwards pull in the rope 61 is stopped by the tongue 85 of the latch 81 locking the stopper 107 in position with its flat end engaging the tongue 85. This allows the bucket to be emptied completely.

The pilot now again activates the solenoid for a short time, the tongue 85 is retracted, so that the second stopper 107 is released and the rope 61 is wound up on the reel 65 under the torquing force of the recoil spring 77. The latch 81 snaps back under the pressure of the leaf spring 102 and allows the first stopper 105 to pass with its rounded end pushing back the tongue 85 momentarily. This brings the tubular extension 51 back into its withdrawn position and the bucket is ready to be filled again.

I claim:

1. A collapsible fire fighting bucket to be suspended from an aircraft and preferably to be filled from an open body of water, e.g. from a lake, comprising:
   (a) an open bucket body made of pliable material and having an upper rim, a side wall, and a bottom;
   (b) a dump valve in the form of a tubular extension made of pliable material and extending from the bottom and having a free end formed with a discharge port, the extension being adapted to be withdrawn into the bucket towards its open top with the discharge port remaining below the water surface of the full bucket;
   (c) upper rim stiffening means;
   (d) means for suspending the bucket from the aircraft comprising a connector adapted to be connected to the aircraft and a plurality of first flexible tension links connected between the bucket and the connector;
   (e) supporting means for releasably supporting the free end of the tubular extension comprising a second flexible tension link adapted to be held under tension for holding the tubular extension in its withdrawn position and to be released for allowing the tubular extension to extend for dumping the water;
   (f) a resilient lip on the discharge port forming two opposite lip sections and sealing means for bringing the opposite lip sections into sealing engagement for minimizing water leakage from the tubular extension, the sealing means cooperating with the second flexible tension link.

2. A bucket as claimed in claim 1, further comprising side wall stiffening means dimensioned such that the side wall remains essentially straight while submerged under a low pulling force, but will bulge outwards while submerged under a higher pulling force, so as to adapt the capacity of the bucket to the load carrying capabilities of the aircraft.

3. A bucket as claimed in claim 2, wherein the side wall stiffening means are a plurality of peripherally spaced apart ribs connected to the side wall and extending longitudinally between the upper rim and the bottom.

4. A bucket as claimed in claim 3, wherein the ribs are received in pockets on the side wall of the bucket.

5. A bucket as claimed in claim 1, the suspending means further comprising a flexible circumferential tension link supporting the bottom of the bucket and wherein the first flexible tension links each are connected with one end to the connector and with the other end to the flexible circumferential tension link, the first flexible tension links being connected to the side wall of the bucket in peripherally spaced relationship.

6. A bucket as claimed in claim 5, wherein the first flexible tension links each have a section formed by a belt, which is connected to the side wall.

7. A bucket as claimed in claim 5 or 6, further comprising a plurality of open ended, peripherally spaced apart, longitudinal pockets on the side wall for receiving the first flexible tension links.

8. A bucket as claimed in claim 1, further comprising a plurality of third flexible tension links, each connected with one end to the second flexible tension link and with the other end alternately passing through one or the other sealing lip section and engaging the opposite sealing lip section for bringing the sealing lip sections into sealing abutment when tension is applied to the second flexible tension link.

9. A bucket as claimed in claim 8, wherein the third flexible tension links include resilient sections for averaging the tension.

10. A bucket as claimed in claim 1, further comprising a reel rotatably attached to the connector and biased by a recoil spring for winding up the second flexible tension link and pulling the tubular extension into the withdrawn position; locking means cooperating with the second flexible tension link for holding said link in the wound-up state against the force of the water load in the bucket and for releasing said link to unwind under said force for allowing the tubular extension to dump the water in its extended position.

11. A bucket as claimed in claim 10, wherein the locking means cooperate with the second flexible tension link to hold said link in the unwound state against the force of the recoil spring for complete dumping of the water and to allow said link to rewind under the force of the recoil spring for returning the tubular extension to its withdrawn position.

12. A bucket as claimed in claim 10 or 11, wherein the locking means comprise:
(a) a guide member through which the second flexible tension link passes;
(b) a stop member connected to the second flexible tension link at a pre-determined position for stopping the movement of said link; and
(c) a remote controlled latch cooperating with the guide member for locking or passing a stop member.

13. A bucket as claimed in claim 12, wherein the latch is operated by a solenoid, remote controlled from the aircraft.

14. A bucket as claimed in claim 1, wherein the upper rim stiffening means are a plurality of stiffeners overlappingly received in circumferentially disposed pockets.

15. A bucket as claimed in claim 1, further comprising ballast means positioned adjacent the upper rim and the bottom on one side of the bucket for achieving fast submersion during the filling procedure.

16. A bucket as claimed in claim 15, wherein ballast is received in closable pockets.

* * * * *